US006370182B2

United States Patent
Bierly et al.

(10) Patent No.: US 6,370,182 B2
(45) Date of Patent: Apr. 9, 2002

(54) INTEGRATED BEAMFORMING/RAKE/MUD CDMA RECEIVER ARCHITECTURE

(75) Inventors: Scott Bierly, Oak Hill; Marc Harlacher, Herndon; Robert Smarrelli, Oak Hill, all of VA (US); Aaron Weinberg, Potomac, MD (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 0 days.

(21) Appl. No.: 09/778,854

(22) Filed: Feb. 8, 2001

Related U.S. Application Data

(63) Continuation-in-part of application No. 09/707,909, filed on Nov. 8, 2000.
(60) Provisional application No. 60/181,571, filed on Feb. 10, 2000.

(51) Int. Cl.[7] .............................................. H04L 27/30
(52) U.S. Cl. ...................... 375/140; 375/147; 375/260; 375/343; 370/335; 370/336; 370/441; 370/442
(58) Field of Search ................................ 375/130, 140, 375/142, 143, 144, 147, 150, 152, 343, 347, 349, 260, 326; 370/335, 336, 342, 343, 441, 442, 319, 320, 321

(56) References Cited

U.S. PATENT DOCUMENTS

| | | | | |
|---|---|---|---|---|
| 5,202,903 A | * | 4/1993 | Okanone | 375/100 |
| 5,420,593 A | | 5/1995 | Niles | 342/357 |
| 5,471,509 A | | 11/1995 | Wood et al. | 375/350 |
| 5,528,624 A | | 6/1996 | Kaku et al. | 375/206 |
| 5,572,216 A | | 11/1996 | Weinberg et al. | 342/357 |
| 5,627,855 A | | 5/1997 | Davidovici | 375/207 |
| 5,638,362 A | | 6/1997 | Dohi et al. | 370/342 |
| 5,654,980 A | * | 8/1997 | Latva-aho et al. | 375/208 |
| 5,764,187 A | | 6/1998 | Rudish et al. | 342/372 |
| 5,781,584 A | | 7/1998 | Zhou et al. | 375/207 |
| 5,793,796 A | | 8/1998 | Hulbert et al. | 375/206 |
| 5,844,951 A | * | 12/1998 | Proakis et al. | 375/347 |
| 5,872,808 A | | 2/1999 | Davidovici et al. | 375/207 |
| 5,901,171 A | | 5/1999 | Kohli et al. | 375/200 |
| 5,910,948 A | * | 6/1999 | Shou et al. | 370/335 |
| 5,943,010 A | | 8/1999 | Rudish et al. | 342/372 |
| 6,052,085 A | | 4/2000 | Hanson et al. | 342/373 |
| 6,128,330 A | * | 10/2000 | Schilling | 375/141 |
| 6,160,803 A | * | 12/2000 | Yuen et al. | 370/342 |

* cited by examiner

*Primary Examiner*—Stephen Chin
*Assistant Examiner*—Cac V. Ha
(74) *Attorney, Agent, or Firm*—Jim Zegeer

(57) ABSTRACT

A spread-spectrum demodulator architecture is presented which utilizes parallel processing to accomplish rapid signal acquisition with simultaneous tracking of multiple channels, while implementing an integrated multi-element adaptive beamformer, Rake combiner, and multi-user detector (MUD). A matched filter computational architecture is utilized, in which common digital arithmetic elements are used for both acquisition and tracking purposes. As each channel is sequentially acquired by the parallel matched filter, a subset of the arithmetic elements are then dedicated to the subsequent tracking of that channel. Additionally, multiple data inputs and delay lines are present, connecting the sampled baseband data streams of numerous RF bands and antenna elements with the arithmetic elements. The matched filter/despreader processing is virtually independent of channel origin or utilization; e.g., CDMA users, RF bands, beamformer elements, or Rake Fingers. Integration of the beamformer weighting computation with the demodulator results in substantial savings by sharing the existing circuitry performing carrier tracking and AGC. An optimal demodulator solution can be achieved through unified "space/time" processing, by providing all observables (element snapshots, Rake Fingers, carrier/symbol SNR/phase, etc.), for multiple channels, to a single adaptive algorithm processor that can beamform, Rake, and perform joint detection (MUD).

22 Claims, 8 Drawing Sheets

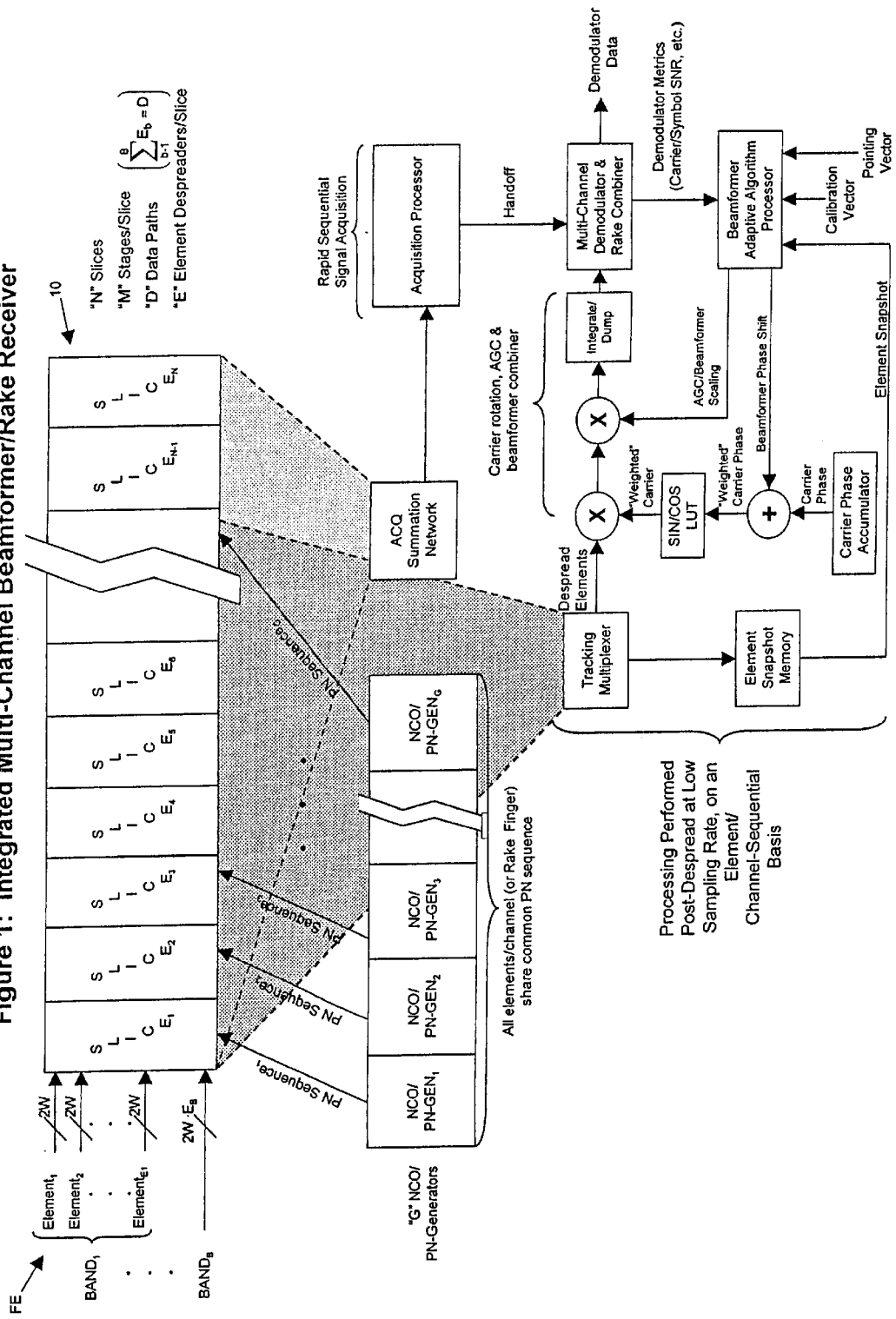
Figure 1: Integrated Multi-Channel Beamformer/Rake Receiver

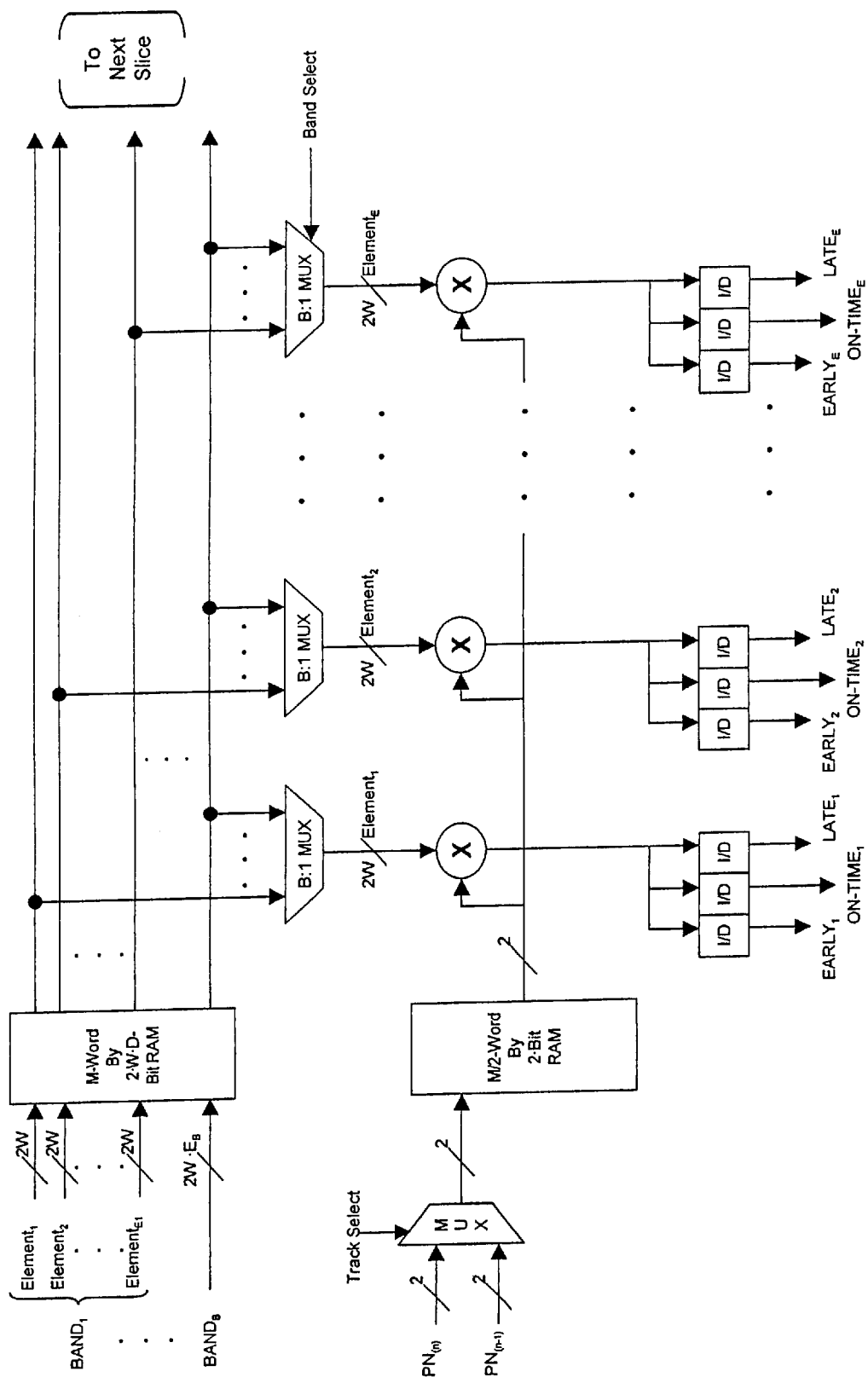
Figure 2: Integrated Beamformer/Despreader Slice Structure

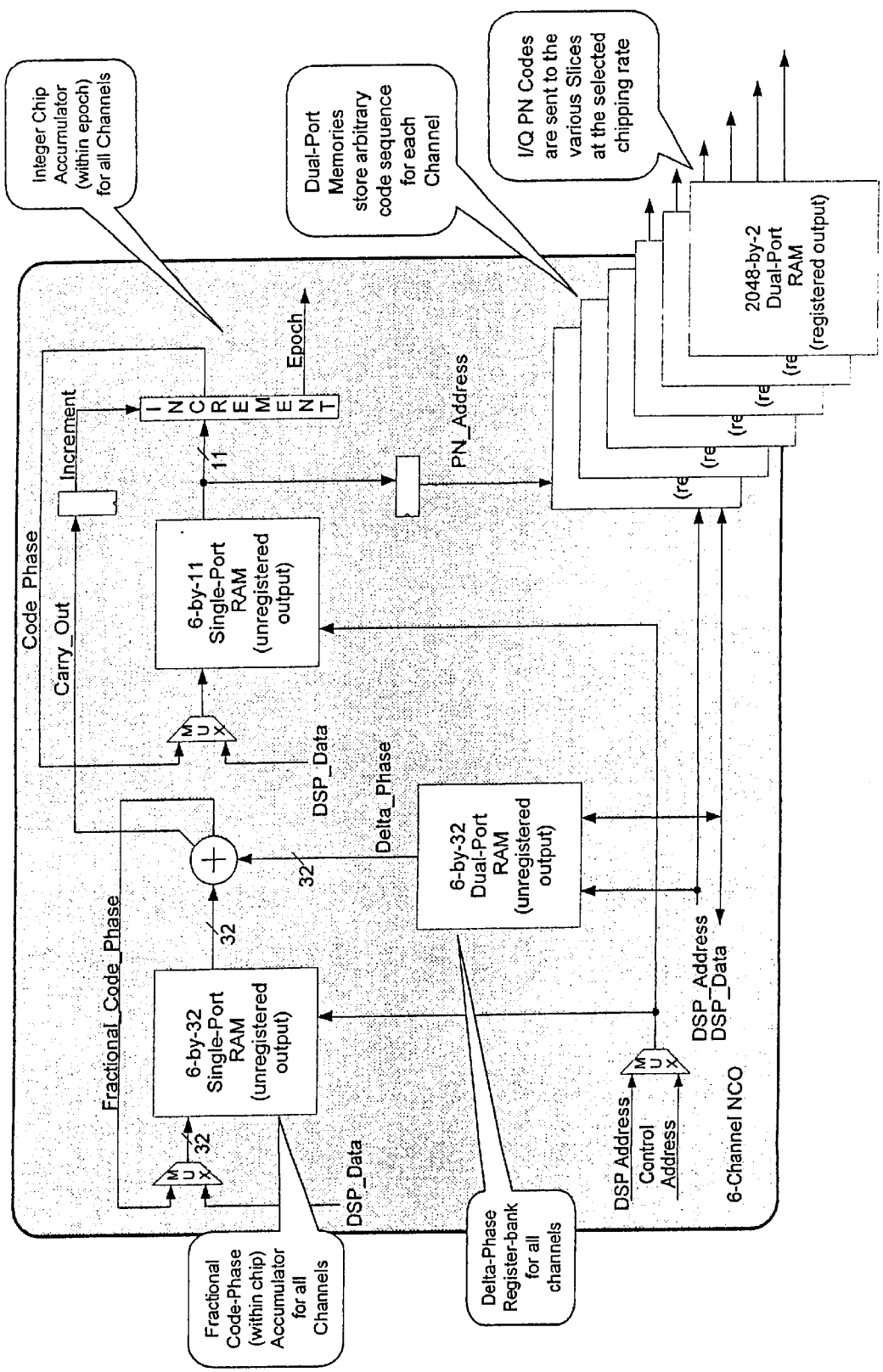

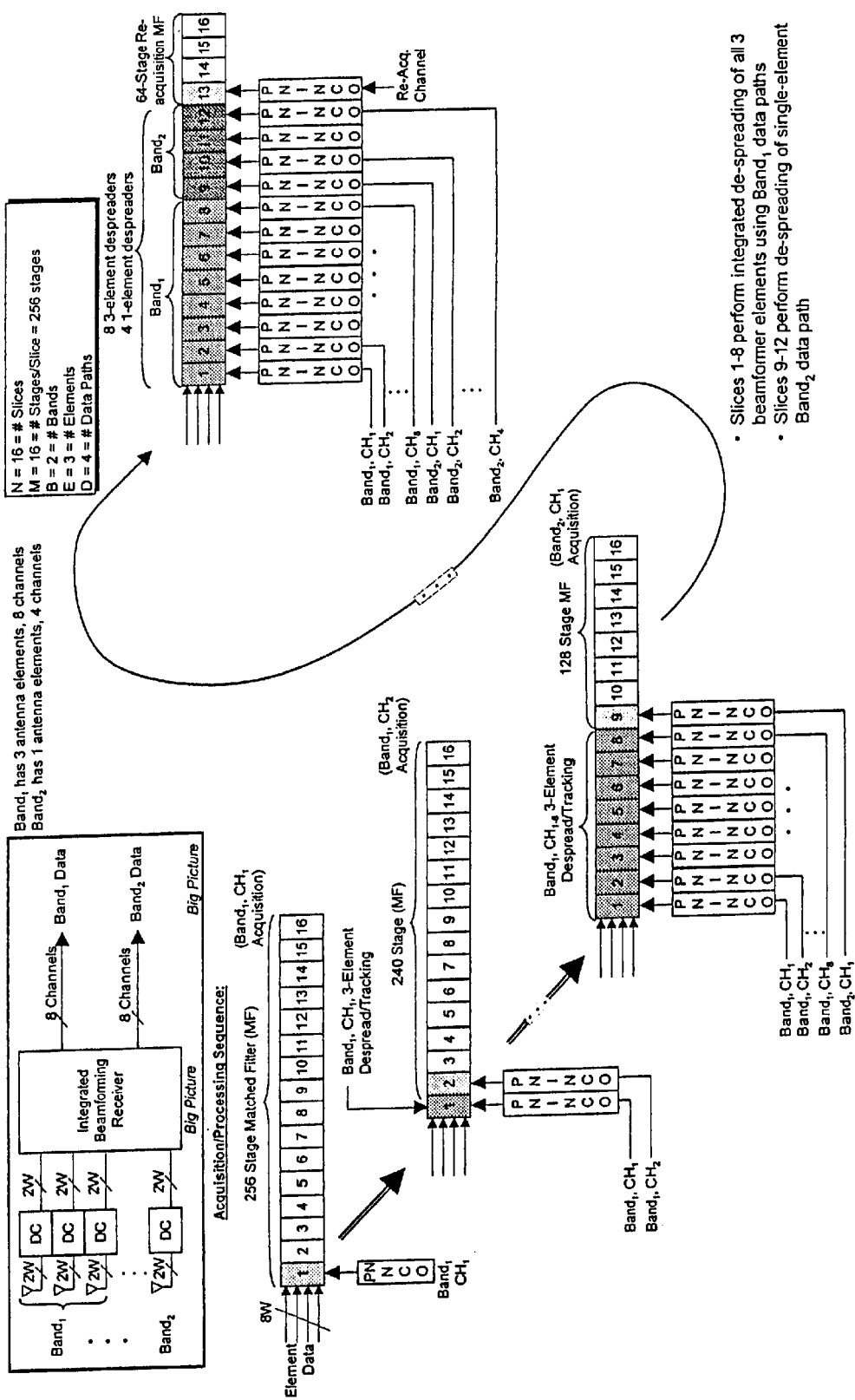

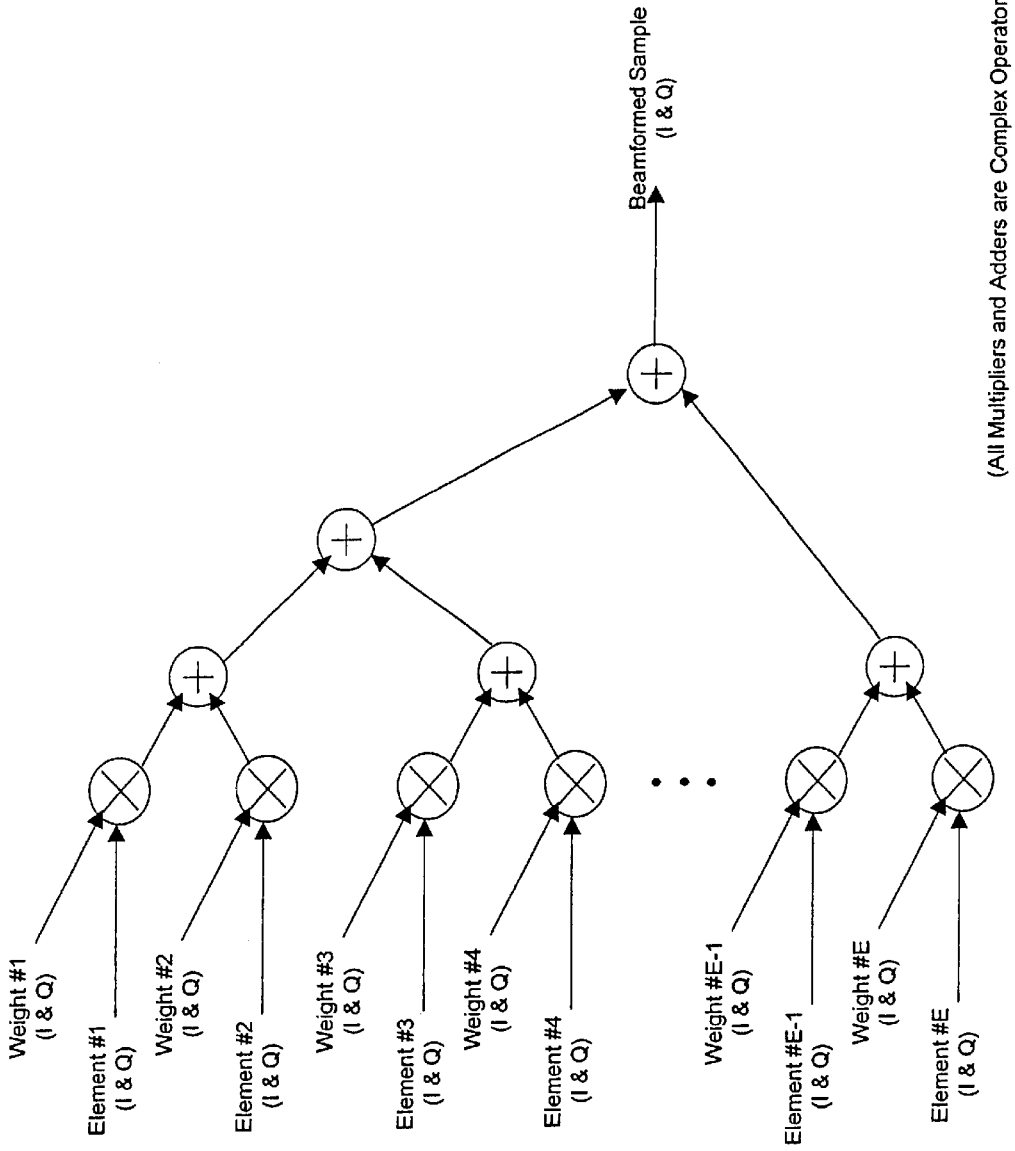
Figure 5: Computation Required for an E-Element Beamformer (Per Sample)

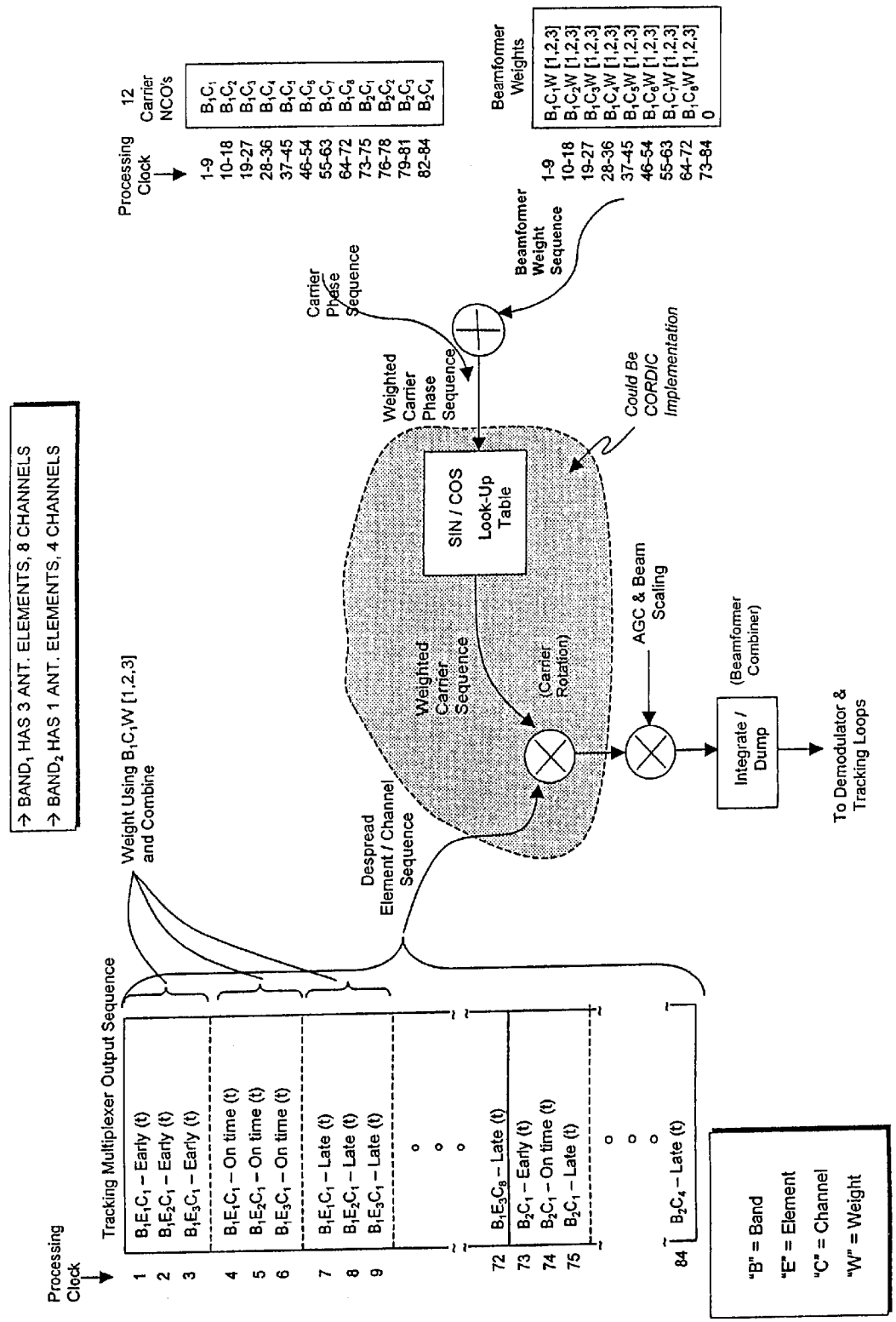
Figure 6: Example #1, 3-Element Beamformer (No Rake)

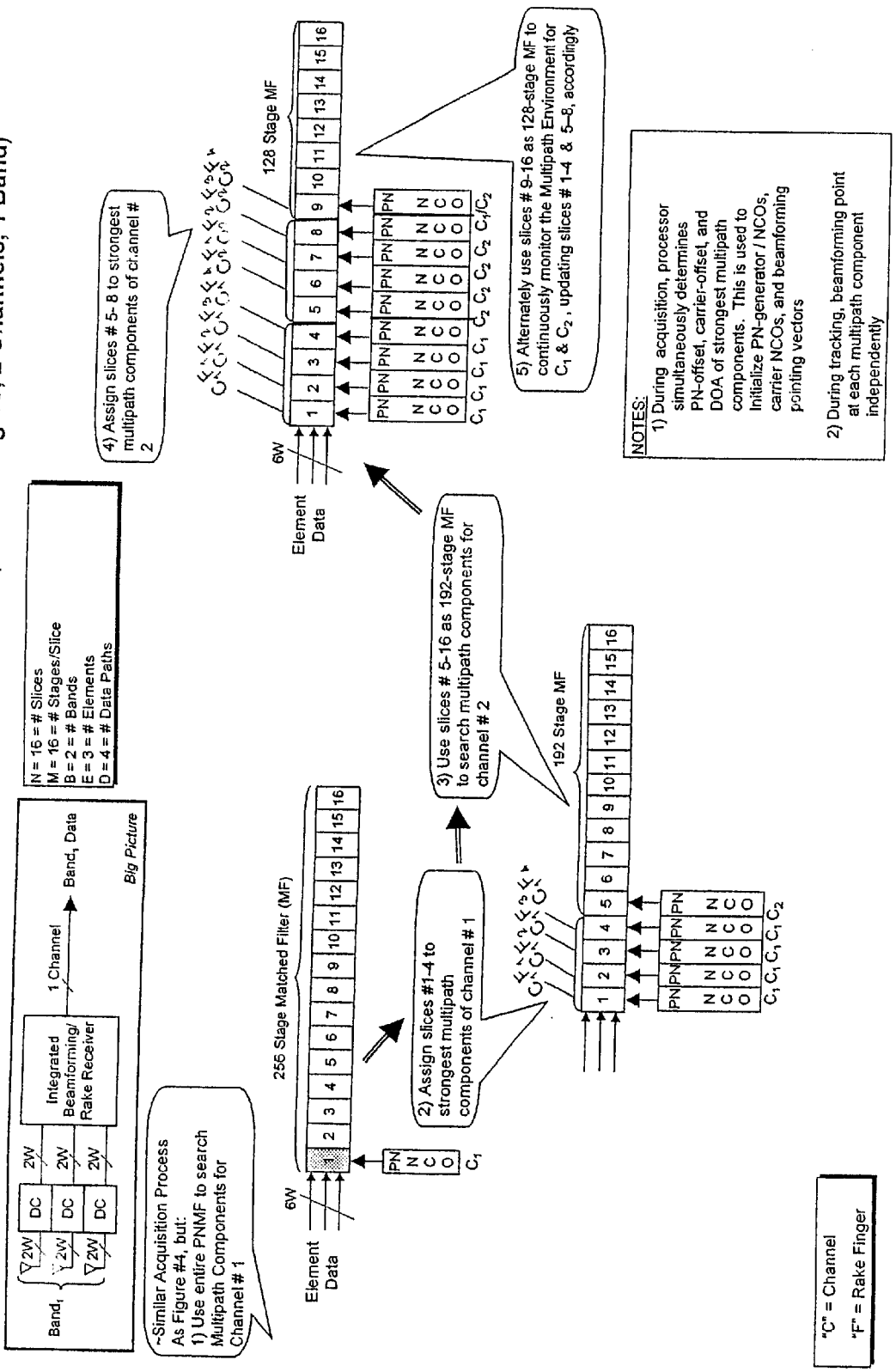
Figure 7: Example #2, 3-Element Beamformer (4 Rake Fingers, 2 Channels, 1 Band)

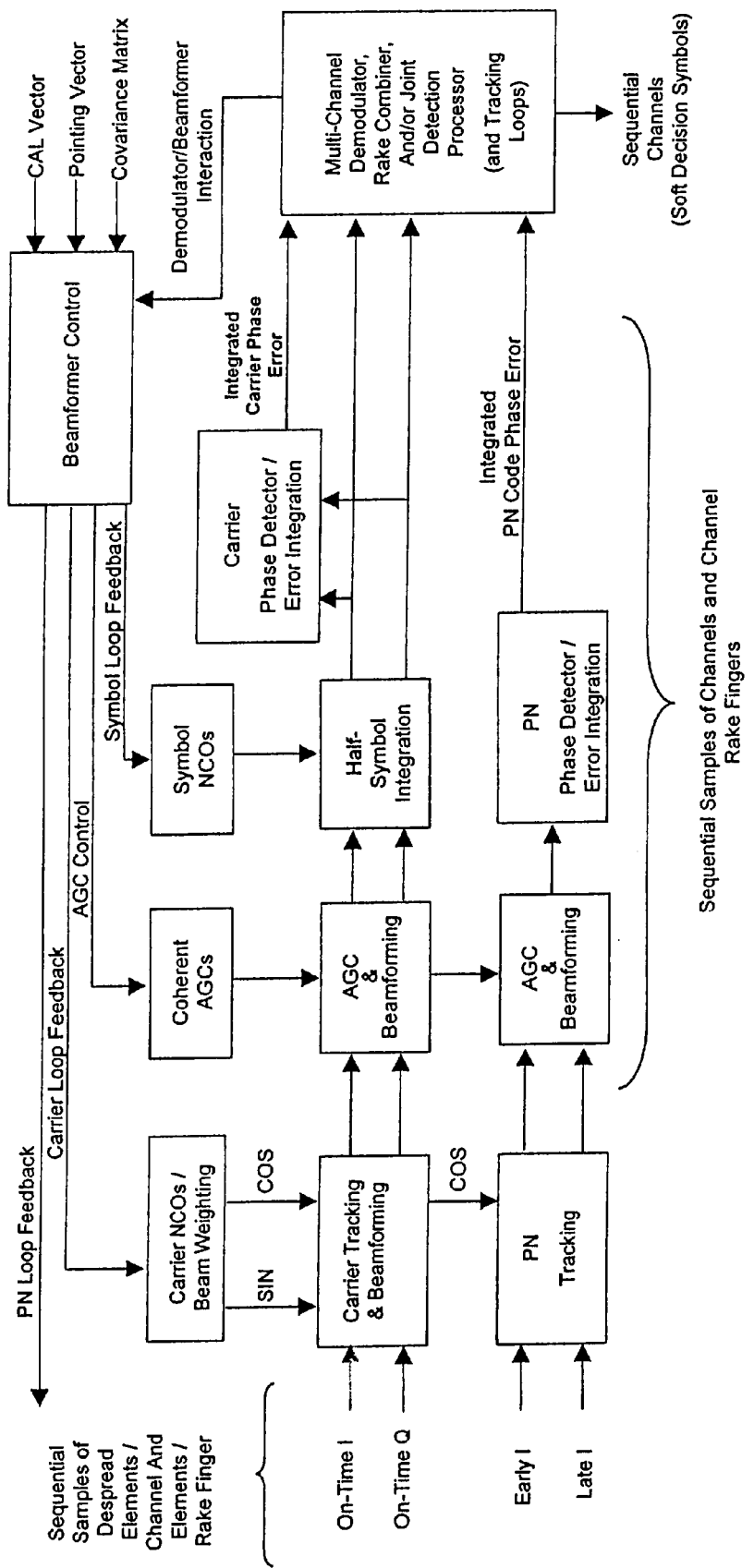
Figure 8: Combined Multi-Channel Demodulator/Beamformer/Rake/Joint-Detection Architecture

INTEGRATED BEAMFORMING/RAKE/MUD CDMA RECEIVER ARCHITECTURE

CROSS REFERENCE TO RELATED APPLICATIONS

The present application is the subject of provisional application Ser. No. 60/181,571 filed Feb. 10, 2000 entitled INTEGRATED BEAMFORMING/CDMA-RAKE RECEIVER ARCHITECTURE. This application is also a continuation-in-part application of application Ser. No. 09/707,909 filed Nov. 8, 2000.

Reference is also made to Weinberg et al application Ser. No. 09/382,202 filed Aug. 23, 1999 and entitled MULTI-BAND, MULTI-FUNCTION, INTEGRATED TRANSCEIVER which is incorporated herein by reference.

BACKGROUND OF THE INVENTION

1. Field of the Invention

This invention relates in general to wireless communication receivers. In particular, it relates to the integration of multiple signal types (CDMA, FDMA, CW, etc.), from multiple bands, with each band and signal type potentially containing multiple user channels, and a single receiver processing architecture with multiple antenna elements per band for sequentially acquiring, and simultaneously demodulating these multiple channels, utilizing jointly-optimized advanced signal processing techniques of digital beamforming, Rake multipath combining, and joint detection.

2. Description of the Prior Art

Matched Filtering

A matched-filter is typically employed in a spread-spectrum demodulator to remove the effects of PN-spreading and allow the carrier and modulating information to be recovered. The digital implementation of a matched filter can be expressed as an integrate-and-dump correlation process, which is of relatively modest computational burden during signal tracking and demodulation. However, it is computationally and/or time intensive to acquire such a signal, where many such correlations must be performed to achieve synchronization with the transmitted spreading sequence. For each potential code-phase offset to be searched (which typically number in the thousands), sufficient samples must be correlated to ensure that the integrated SNR is sufficient for detection. Performed one at a time, acquisition could easily take several minutes to achieve in typical applications.

For applications requiring rapid signal acquisition (e.g., seconds), a highly parallel matched-filter structure may be used to search many spreading code offsets simultaneously. Typically, this computationally expensive apparatus would be underutilized once acquisition is completed, during the much less demanding tracking operation. If the same parallel matched filter is also used for tracking purposes, only perhaps three of its numerous correlation branches (perhaps hundreds) are useful in this instance. Alternatively, it may be simpler to use a separate set of early, on-time, and late integrate-andidump correlators to take over once acquisition is complete; in this case, the parallel matched filter would go completely unused during tracking.

In implementations evidenced by the prior art, the matched-filtering solution has generally fallen into one of several classes:

1. Slow acquisition by sequential traversal of the search space using only the hardware required for tracking a signal; dedicated hardware per channel.

2. Rapid acquisition by parallel traversal of the search space using a dedicated parallel matched filter, which is idle or shut down when dedicated tracking hardware takes over; dedicated hardware per channel.

3. Either class 1 or 2, but multi-band and/or multi-channel, using a loosely integrated but disparate collection of individual processing resources.

Beamforming

Beamforming is a form of spatial filtering in which an array of sensor elements are utilized with appropriate signal processing to digitally implement a phased array antenna, for the purpose of shaping the antenna response over time in a space-varying manner (i.e., steering gain in some directions, and attenuation or nulls in other directions). In a radio communications system, a signal arriving at each element of an antenna array will arrive at slightly different times, due to the direction of arrival with respect to the antenna array plane (unless it has normal incidence to the plane, in which case the signal will arrive at all elements simultaneously). A phased array antenna achieves gain in a particular direction by phase-shifting, or time-shifting, the signal from each element, and then summing them in a signal combiner. By choosing the relative phasing of each element appropriately, coherence can be achieved for a particular direction of arrival (DOA), across a particular signal bandwidth.

Digital beamforming is very analogous to this, except that the signal on each antenna element is independently digitized, and the phasing/combining operation performed mathematically on the digital samples. Traditionally, digital beamforming is done on a wideband signal, prior to despreading a CDMA waveform. This forces the computationally intense beamforming to take place at a much higher sampling rate, resulting in more mathematical operations per second, and corresponding increased hardware cost (there are examples addressing this shortcoming in the prior art, such as Hanson et al., where beamforming is performed at baseband to avoid this and other issues).

Furthermore, digital beamforming is traditionally done as a separate process, independent of symbol demodulation, perhaps even as a separate product from the demodulator. In addition to the resulting inability to support advanced demodulation techniques with this architecture, the cost of the beamforming function is greater as a stand-alone function, compared to the incremental cost of adding the capability to a demodulator. The largest cost-component of beamforming is the complex multiplication of each sample for each element with the beamforming weights. When combined with the demodulator, the complex multiply can be absorbed into computation already taking place for extremely low incremental cost due to beamforming (there is, for example, an implementation of beamforming using digital direct synthesis (DDS) functions in the prior art, such as Rudish, et al.). Thus, whether stand-alone beamformers merely point in the direction of the signal of interest, or respond more adaptively to dynamic interference conditions by null-steering, they still lack the ability to be tightly coupled with potential advanced demodulation techniques.

Rake Combining

Rake combining is a method of mitigating the effects of a multipath interference dominated communications channel, as is adaptive equalization. However, in a typical equalizer, the filter time-span must correspond to the multipath delay spread, and therefore tends to be limited to very close-in multipath, spanning perhaps a few symbols. The Rake, however, exploits the properties of CDMA signals (i.e., during despreading, all other codes become uncorrelated, including copies of the desired code delayed by greater than about half a chip, and are reduced to noise across the entire spread bandwidth) that enables each multipath component (offset by more than about half a chip) to be acquired, tracked, and despread in isolation, and then coherently combined. Much like beamforming, this coherent combining results in increased effective antenna aperture and improved SNR, although using only a single antenna element. This divide-and-conquer approach allows the Rake to span an essentially arbitrary multipath delay spread, applying computational resources based linearly on the number of desired despreader branches, or "Fingers", desired, and not based on the delay spread itself (although acquisition time, and thus dynamic performance, is related to the actual delay spread, as this defines the limits of what must be searched).

In the prior art, Rake combining is typically employed as a dedicated function in a fixed CDMA receiver structure. Resources are designed into the receiver to perform some fixed maximum number of Rake Fingers, and those resources are tied up regardless of whether those Fingers are actually utilized or not. What is needed is a more flexible and generalized receiver architecture, which can task resources on more of a demand basis, and furthermore treat diversity information such as Rake Fingers as simply one of several diversity inputs to be jointly optimized in a common process that yields maximum advantage to each desired user signal.

What is needed is the ability to combine potential spatial processing information with other dimensions of information and diversity, both regarding the signal(s) of interest, and the interference environment. To this end, what is needed is a receiver architecture for efficiently processing spatial information (antenna elements), temporal information (coherent signal multipath components; i.e., Rake Fingers), and interference information (noise power estimates, co-channel interfering symbol soft decisions) jointly and efficiently.

SUMMARY OF THE INVENTION

The present invention applies approaches to achieve rapid acquisition in a multi-band, multi-channel signal environment, by sharing a homogeneous collection of digital processing elements. This is done, in part, by taking maximum advantage of the computational commonality between the acquisition and tracking correlation processes. Furthermore, the mismatch in computational demand between acquisition and tracking is exploited by creating a multi-channel, multi-band integrated receiver. Since only a small percentage of the computational resources are consumed by tracking an individual channel, the remaining resources may be employed to accelerate the acquisition of additional channels. As more resources become dedicated to tracking, fewer remain for acquisition; this has the effect of gradually reducing the number of parallel code offsets that can be searched, gradually increasing acquisition time. In many applications, such as a GPS receiver, this is quite acceptable, as generally additional channels beyond the first four are less urgent, and are used primarily for position refinement, and back-up signals in the event that a channel is dropped. These ideas are the subject of U.S. patent application Ser. No. 09/707,909, filed Nov. 8, 2000, entitled "Sequential-Acquisition, Multi-Band, Multi-Channel, Matched Filter", and are preserved as features of the present invention.

The present invention embodies various extensions to the previously disclosed invention, wherein the multi-band capability is evolved to support multiple antenna elements at a common band (as well as other bands), to support digital beamforming; the multi-channel capability is evolved to support multiple Rake Fingers on a common channel (as well as other channels); and the multi-channel demodulator capability is evolved to support computationally efficient, simultaneous processing of all bands, elements, channels, and Rake Fingers. The present invention thus forms an architectural framework capable of hosting a variety of algorithms for joint space-time optimization of individual user channels in a multipath environment, as well as multi-user (joint) detection of multiple user channels limited by co-channel interference. By considering these capabilities together, rather than as independent solutions to problems, considerable efficiencies and improvements are realized by this invention, in comparison to the prior art.

In the first aspect of the present invention, the multi-datapath receiver architecture allows independent automatic-gain control (AGC) between multiple input bands B or elements E, minimizing inter-band/element interference, and avoiding additive noise compared to schemes that combine the bands/elements into a single signal and data stream.

To accomplish this, the present invention efficiently processes multiple streams of W-bit complex sampled data (real data is easily processed as well, by adding a complex-to-read conversion to the front of the matched filter), so that multi-band or multi-element receiver signals can be kept spectrally separated. This concept, implemented using D data storage paths, supports D bands and elements when shifting at the data sampling rate ($F_{samp}$); alternatively, the same D data storage paths can support D*k bands and elements by multiplexing the multi-band/multi-element streams and shifting the data at the higher sampling rate of $k*F_{samp}$.

In another aspect of the present invention, the parallel acquisition correlator, or matched-filter, aids in rapid pseudo-noise (PN)-acquisition by simultaneously searching numerous possible PN-code alignments, as compared with a less compute-intensive (but more time-intensive) sequential search. Multiple channels of data may be co-resident in each band/element and sampled data stream using Code Division Multiple Access (CDMA) techniques, and multiple bands/elements and sampled data streams share the common computation hardware in the Correlator. In this way, a versatile, multi-channel receiver is realized in a hardware-efficient manner by time-sequencing the available resources to process the multiple signals, multiple antenna elements, and multiple multipath components resident in the data shift registers simultaneously.

In still another aspect of the present invention, the matched filter is organized into N "Slices" of M-stages/Slice. Each Slice is composed further of D data paths supporting multiple bands B and/or antenna elements E. Each Slice can accept a code phase hand-off the from the PN-Acquisition Correlator and become a PN-tracking despreader by providing separate outputs for early, on-time, and late correlations for each element (with spacing depending on the sampling rate; typically half a chip). Slices are handed-off for tracking in the same direction as data flows, and correlation reference coefficients are shifted (for instance, left to right)-this permits shifting data to be simultaneously available for the leftmost Slices that are using the data for tracking, and rightmost Slices that are using the data for acquisition. Each Slice can choose between using and shifting the acquisition reference coefficient stream to the right, or accepting the handoff of the previous acquisition reference coefficient stream and using it to track the acquired signal.

In still another aspect of the present invention, the Acquisition correlator can integrate across all available Slices to produce a single combined output, or the individual Slice integrations can be selectively output for post-processing in the case of high residual carrier offsets or high-symbol rates, where the entire N*M-stage correlator width cannot be directly combined without encountering an integration cancellation effect. Alternatively, the Acquisition correlator can be configurable to switch from coherent integration to non-coherent integration, by taking the magnitude of I and Q partial integrations within the summer tree, or Slices themselves, at a point appropriate for the signal being acquired.

In yet another aspect, the present invention embodies a Scaleable Acquisition Correlator, which when tracking a maximum of G independent channels and/or Rake Fingers, can use the remaining N-G Slices to search for new signals for fast re-acquisition of dropped signals, and for continually searching the multipath environment for Rake Fingers to track dynamic channel conditions. Initially, Slices will be allocated sequentially (for instance, from left to right), but after running for some time, with signals alternately being acquired and dropped, the Slice allocation will most likely become fragmented, resulting in inefficient use of the Acquisition Correlator. This can be resolved by implementing a de-fragmentation algorithm that swaps tracking Slices around dynamically to maximize the number of contiguous rightmost Slices, and thus optimize Acquisition.

In another aspect, the present invention contains G independent numerically-controlled oscillator (NCO)-based PN-Code Generators with almost arbitrary code rate tracking resolution (for example, better than 0.0007 Hertz for a 32-bit NCO clocked at 3 MHz). All NCOs run using a single reference clock which is the same clock that is used for all signal processing in the Matched-Filter and Demodulator. Ultra-precise tracking of PN Code phase is maintained in the G independent phase accumulators. Multi-channel NCOS can in one embodiment be efficiently implemented by sharing computational resources and implementing phase accumulation registers in RAM, for the case when the processing rate is in excess of the required NCO sampling rate. Note that while each channel and Rake Finger requires its own PN-NCO, a single NCO is shared across all elements when beamforming.

In still another aspect of the present invention, the incoming wideband element data is made available to all Slices, which allows each element to be independently despread for each channel/Rake Finger using the core matched filter structure. As a result, beamforming is easily performed at narrowband (despread) sampling and processing rates, and with improved potential precision. The present invention is an improvement over the prior art, because in addition to the raw computational savings of narrowband processing, the beamformer hardware is time-shared across multiple elements, channels, and Rake Fingers for improved computational efficiency.

In another aspect, the present invention allows the Beamforming computation to be implemented with only additional adders, due to integration with the demodulation carrier phase rotation and the AGC scaling functions.

In yet another aspect, the present invention allows an element snapshot memory to operate at narrowband sampling rates, allowing an eased implementation for any snapshot operations required.

In still another aspect, integration of the beamformer with the demodulator in the present invention allows advanced adaptive algorithms to be implemented that can be enhanced by the feedback of post-demodulation metrics such as PN-SNR/phase, carrier-SNR/phase, symbol-SNR/phase, as well as error control decoding metrics.

In still another aspect of the present invention, the integrated beamforming CDMA Rake receiver exploits both space and time diversity aspects of a multi-path environment by assigning Slices to each Rake Finger, and steering beams that individually optimize along the line-of-sight (DOA) of each multipath reflection (i.e., a potential beam for each Rake Finger).

In another aspect of the present invention, the integrated multi-channel demodulator and Rake combiner make coherent complex symbol data for each Rake Finger (potentially for multiple user channels sharing the same frequency band), as well as individual channels not being Raked, available to a single optimization process. This allows the use of advanced multi-user detection (MUD) algorithms (e.g., joint detection) to mitigate co-channel interference that has not been suppressed by beamforming.

In yet another aspect, the present invention's Slice-based data-flow computational architecture permits dynamic, flexible allocation of resources between tracking of multiple input bands, user channels, and Rake Fingers, and acquisition resources for dropped/new channels and continuously monitoring Rake dynamics.

In another aspect, the matched-filter Slice architecture of the present invention contains PN-tracking integrators (i.e., early, on-time, late) for each beamforming element. Furthermore, after all elements are weighted and combined, the demodulator architecture uses the combined early/on-time/late integrations to maintain a single PN-tracking loop for each beamforming channel, or Rake Finger.

In another aspect, the present invention allows each beamforming channel, or Rake Finger, to combine data from all elements and form a composite carrier and symbol discriminator that allows all elements of that channel to be tracked with a single carrier loop, and a single symbol loop.

In still another aspect, the present invention's multi-channel architecture allows continuous on-line element calibration capability to take place. Furthermore, calibration can be performed independently on each user channel, and each Rake Finger, closing the calibration loops individually to remove essentially all bias terms.

BRIEF DESCRIPTION OF THE DRAWINGS

FIG. 1 is a generalized functional block diagram of the multi-channel matched filter architecture, illustrating the multiple input bands, the multiple NCO-based PN Generators, and the division of the parallel matched filter into multiple Slices; the matched filter can be seen to have an acquisition output, and a tracking output which sequentially sends despread element data for each channel and each channel's Rake Finger into the integrated multi-channel beamforming demodulator and Rake combiner.

FIG. 2 is a generalized functional block diagram of the matched filter Slice architecture (for the specific embodiment in which RAM structures are utilized to form highly efficient data storage cells, for the case of relatively low sampling rates); note that each Slice shares a single PN chipping stream for despreading, and contains "E" computation elements, corresponding to the number of supported beamformer elements; each computation element is shared across all "M" stages/Slice.

FIG. 3 is a functional block diagram showing an example embodiment of the multi-channel, NCO-driven, PN code Generator, using efficient RAM-based state machines.

FIG. 4 is an illustration of the sequential acquisition and handoff to tracking in the matched filter, showing how multiple antenna elements along with multiple signal bands and channels are handled simultaneously, using an example embodiment and a time sequence of resource allocation diagrams.

FIG. 5 is a dataflow diagram showing the complex arithmetic calculations required to weight and combine all beamformer elements for each despread sample coming from the matched filter.

FIG. 6 illustrates how the embodiment in FIG. 3 might produce sequential despread outputs, corresponding to each band, element, and channel (early, on-time, and late), as well as the sequence of carrier NCO outputs and beamformer weight outputs that might be produced during the tracking process; this figure also shows graphically how these sequences flow through computation elements to simultaneously accomplish both the carrier tracking and beamforming functions (no Rake in this example).

FIG. 7 is an illustration of the sequential acquisition and handoff to tracking in the matched filter (similar to FIG. 4), for a different example embodiment containing beamforming and Rake combining, using a time sequence of resource allocation diagrams.

FIG. 8 is a functional block diagram of one embodiment of a processing architecture for the integrated beamforming/Rake multi-channel demodulator, illustrating: the manner in which sequential data from the PN matched filter is processed to form PN, carrier, AGC, and symbol tracking loops for each channel and Rake Finger; the integration of the carrier tracking rotation and beamforming functions; and the presentation of all channels and Rake Fingers to a single integrated demodulator, which can host a variety of algorithms capable of optimizing and combining same-channel multipath (Rake Fingers) and joint detection of multiple, potentially interfering, co-channel users.

DETAILED DESCRIPTION OF THE PREFERRED EMBODIMENT(S)

The first aspect of the preferred embodiment relates to the implementation of multiple channel, multiple frequency band receivers. At any given point in time, the state of the art in analog-to-digital conversion (A/D) chips, and subsequent digital signal processing (DSP) technology for performing data demodulation, will allow only a certain amount of frequency spectrum (band) to be digitized into a single data stream. Within that band, multiple user channels can coexist using various well known multiple-access techniques such as FDMA, TDMA, CDMA, etc.

When additional channels of interest lie outside of the frequency bandwidth that can be digitized into a single digital band, and simultaneous reception is required from each band, then multiple RF downconverters and A/Ds must be used to digitize multiple bands. The present invention allows an arbitrary number of such bands to be processed together in a unified computational engine. In this embodiment, a pool of arithmetic processing resources, or receiver channels, can be applied on demand to various user signals, regardless of which band they originated in. In this way, an almost arbitrary variety and amount of frequency spectrum can be utilized, and an almost arbitrary number of user channels of varying modulation type can be digitally extracted from it.

There are several advantages of using this technique to present multiple bands to a single receiver structure. Firstly, it is well known that as wider bandwidths containing multiple and various signals are received together, increasing analog fidelity requirements are imposed. This is a significant limitation, in that analog circuitry suffers from such problems as intermodulation distortion (IMD), where multiple frequency sources interact to produce distortion components. The present invention optimizes the analog signal fidelity by digitizing downconverting and digitizing each band, while preserving the advantages of a digital "software" radio-namely, integrated, flexible, multi-channel demodulation using DSP techniques.

Secondly, given an arbitrary RF and A/D dynamic range, it is desirable to use automatic gain control (AGC) to capture the signal of interest within the available amplitude range of both analog circuitry and A/D converter. As wider bandwidths containing multiple and various signals are digitized together, they must also be subject to a common AGC process, which will be dominated by the largest signals across all bands; this potentially decreases the SNR of the smaller signals, due to A/D quantization noise. The present invention optimizes the AGC process by allowing each band to be treated separately.

Thirdly, other schemes to digitize a composite mix of various frequency bands might use a technique of summing together the signals after translation to non-overlapping adjacent intermediate frequencies, allowing the use of a single A/D converter. In this type of scheme, the limitations of the analog circuitry will dictate that additive noise from each of the various RF bands will somewhat degrade the signal-to-noise ratio (SNR) of the resultant composite signal. The present invention optimizes the SNR of each band by maintaining separate RF, IF, and digital signal paths.

Fourthly, this aspect of the present invention directly supports digital beamforming by utilizing this multi-band receiver technique. Since digital beamforming involves the use of a multi-element antenna, resulting in dedicated RF downconversion paths for each element, the present invention allows beamforming to be accommodated in a flexible, scalable fashion, by treating each element in the same manner as if it were another signal band. Naturally, the RF implementation can in fact be simplified in comparison with the generic multi-band case, because a dedicated Beamformer implementation could optimize the frequency synthesis circuitry by using the same LO for each antenna element downconverter. If the beamformer combiner is implemented after the matched filter (despreader), the digital implementation is now able to treat each element as though it were just another datapath for another signal band.

The second aspect of implementing the preferred embodiment relates to the architecture of the flexible computation core of the digital matched filter. The architecture has been designed to satisfy two different driving requirements: accelerated acquisition of a single user channel, and simultaneous tracking of multiple user channels. Referring to FIG. 1, front end circuitry FE provides complex baseband samples for a plurality of frequency bands and multiple channels in the radio spectrum to an (N*M) stage data delay line (shown as being embodied by N distinct Slices), composed of B distinct bands, each band composed of E distinct elements of 2*W bits each (W bits I, W bits Q complex data), contains a sequence of samples of the bands of interest. It is well known that the sampling rate must be chosen to satisfy the Nyquist criterion to preserve the appropriate signal bandwidth of interest, and to allow sufficient time resolution for acquisition and tracking; generally two or more times the chipping rate for a spread spectrum signal. The data is then shifted through the data delay lines at the sampling rate.

For the purposes of acquisition, a single numerically controlled oscillator (PN-NCO) is needed, to serve as a finely controllable digital frequency source matched to the expected chipping rate of the incoming signal. In conjunction with this, during acquisition a single PN chip Generator is needed, to reproduce the PN sequence of the incoming signal, at the rate dictated by the PN-NCO. This PN Sequence is then presented to the leftmost end of the data delay line (to the leftmost Slice), where it is also shifted from left to right down a PN sequence delay line (shown in more detail in FIG. 2). At appropriate time intervals, the state of the PN sequence delay line is latched into a reference correlation register. The computational logic within the Slices then performs a correlation of the latched reference PN sequence against the signal samples contained in the data delay line. Note that in the example embodiment in FIG. 2, the Slice architecture is illustrated with a RAM-based implementation, which is efficient for low sampling rates with respect to the available processing rate. Other embodiments of the present invention might utilize a register-based architecture variant, which would allow for much higher sampling rates (less than or equal to the processing rate); registers are in that case used for all data shift-registers.

For each sample time, up to (N*M) multiplications (or N*M*E, if elements are acquired in parallel) are performed of each data sample with its corresponding reference PN chip (in some applications, the stages are decimated prior to performing the correlation, so that not all are tapped for computation); all of these products are then summed into a single partial correlation value by the Acquisition Summation Network shown in FIGS. 1–2, which is then passed on to the demodulator circuitry for further integration, beamforming and Rake Finger selection (depending on the acquisition scheme chosen), thresholding and detection. Because the data samples are shifted by one position at each sample time, and the latched reference PN sequence is held in the same position over a period of time (update period), each sequential partial correlation within a given update period represents a different potential alignment (code offset) between the reference PN sequence and the received signal. In this way, over time a correlation is performed for all possible code offsets, to within the nearest fraction of a chip defined by the chosen sampling rate; the timing of the latch update period, and the NCO/PN-Generator code phase, are carefully controlled to determine the specific offset search sequence. The post-processing circuit can perform additional integrations for each code offset to achieve sufficient SNR to enable detection at the correct offset.

At this point, the receiver can be said to have completed PN acquisition, and the matched filter is able to go into PN tracking mode. During tracking, the problem is substantially easier. If there were no phase or frequency drift present, only the single correctly aligned correlation sequence must be computed; that would be a single multiply and sum per input sample. Since there are phase and frequency drifts (i.e., the reference PN-NCO frequency setting becomes incorrect over time) in typical applications, two additional correlations must be computed as well, corresponding to the code offsets that are slightly early and slightly late, with respect to the currently tracked (on-time) code offset. These correlations allow the PN phase and frequency drift to be observed and tracked with the PN-NCO, using well known PN tracking loop techniques. The early, on-time, and late correlations (or partial correlations) are output via a separate signal path to the demodulator tracking circuitry. So, where (N*M or N*M*E) multiplies and sums must be computed for each input sample during acquisition, only (3*E) multiply/sums must be computed for each sample during tracking. Since there is motivation to choose (N*M) to be as large as possible for rapid acquisition, this leaves a substantial surplus of computational horsepower idle during tracking.

Thus, the primary nature of the second aspect of implementing the present invention lies in the agility of the computational structure in transitioning, one Slice at a time, from being part of an acquisition correlation process as described above, to being part of a tracking correlation process as described above. For the multi-channel case, this involves adding additional NCO/PN-Generator pairs corresponding to the desired number of channels and Rake Fingers (shown as G in FIG. 1) to be simultaneously tracked. Each of these creates a unique PN sequence, at unique chipping rates, and presents them to unique Slices, from left to right, as shown in FIG. 1.

Each combination of NCO/PN-Generator and Slice (matched up from left-to-right) form the required computational capability for tracking a single user signal, or single Rake Finger for a single user signal. The rightmost unused NCO/PN-Generator pair, and all rightmost unused Slices, form the available computational capability for acquiring a new user signal, and for searching for and acquiring the strongest Rake multipath components. The amount of time required to acquire the new signal depends on the number of correlation stages available, because that determines the number of correlation samples that are integrated at each sample time. All of this computation, for acquisition and tracking of multiple channels, happens concurrently using the flexible computation resources, and occurs transparently with respect to the multiple bands and elements of sampled data that constantly stream through the data delay lines. This entire process is illustrated in FIGS. 4, 6 and 7.

The third aspect of implementing the preferred embodiment relates to the partial acquisition integration method. For the problem of PN Acquisition, it would be ideal to integrate an arbitrary number of correlation samples until the appropriate SNR level is reached. However, this cannot be done in the presence of residual carrier components due to unknown doppler and other frequency offsets, which would cause integrations across complete carrier cycles to cancel out. In a similar manner, integrations across multiple data symbol transitions also causes cancellation. These effects limit the useful size of the acquisition matched filter, and would normally force much of the computational capabilities to go unused (through masking-out of that portion of the filter which exceeds the appropriate integration length). This problem is mitigated in the present invention by allowing the individual Slice partial integrations to be output to the post-processing circuitry. Various methods can be used to combine the partial integrations non-coherently into a complete integration while mitigating the cancellation effects.

An alternative embodiment of the present invention accomplishes this same goal by modifying the Slice architecture slightly to incorporate the magnitude detection circuitry, or other means of switching to non-coherent integration, directly into each Slice. This would allow each Slice to be configurable to integrate the appropriate amount of signal coherently, perform detection, and allow the summer tree to perform non-coherent summation of each Slice's output, passing that sum to the acquisition circuitry to complete the integration/detection process.

In a fourth aspect of the present invention, the preferred embodiment employs a defragmentation algorithm to ensure that the maximum acquisition capability is maintained over time. This is particularly important with the use of the Rake combiner functionality, as multipath components can change rather dynamically, depending on the channel environments; acquisition resources will continually need to be available to monitor and acquire them. The manner of sequential acquisition and, from left to right in FIG. 1, allocation of Slices for tracking has been described. In that initial context, the rightmost Slices are always optimally utilized for acquisition; none are wasted. However, as signals are dropped in a multiple channel tracking environment, holes will develop where middle Slices are no longer tracking, but cannot participate in acquisition in the normal fashion due to isolation from the rightmost Slices.

This problem is mitigated in the present invention by swapping out tracking Slices from right to left in order to maintain contiguous unused rightmost Slices for acquisition. This is done by initializing the NCO/PN-Generator of the unused (left) Slice to run in offset-synchronism with the currently tracking (right) Slice that is to be moved; offset, in the sense that chipping frequency is identical, but code phase is advanced by an appropriate amount to correspond with the relative difference in received signal phase at the two Slices. In units of time, this is basically the number of delay stages of offset between the two Slices, divided by the sampling rate. At the known chipping rate, this is easily converted to a code offset. After the handoff is complete, the process is repeated until all tracking Slices are packed to the left.

The fifth aspect of implementing the preferred embodiment involves a method of using a single clocking system, synchronous to the data sampling clock, to generate G independent NCO/PN-Generators that produce PN chipping sequences whose average rates can very precisely track the various received signal chipping rates. Also, if the NCO processing clock is in excess of the required NCO sampling rate, efficient RAM state storage and code phase computational hardware can be time-shared for reduced hardware size (if this is not the case, a more traditional register-based embodiment of the NCO would be required). A block diagram of this concept is shown in FIG. 3.

Because each NCO is operating at the NCO sampling rate (perhaps equal to the data sampling rate), it can only make a decision to advance to the next chip at those coarse sampling intervals. Thus, even though the NCO phase accumulator knows when to advance to the next chip to within fractions of a sampling interval, it must incorrectly wait until the end of the sampling interval to do so. However, this chip-jitter averages out in the long term (as long as the NCO sampling rate is asynchronous to the chipping rate); furthermore, because the NCO clocks are all synchronous to the data sampling clocks, the jitter exactly reflects the effective jitter that will be contained in the received chip transitions. In other words, both the incoming signal code phase, and the internal accumulated code phase will track very precisely; since they are both asynchronously sampled by data/NCO sampling clock, a common phase jitter will be superimposed onto both, such that the jitter itself causes no additional processing loss.

FIG. 3 shows an example 6-channel implementation of the RAM-based PN-code Generator. In this example, it is assumed that the processing clock is at least 6 times the desired NCO sampling rate. So, within the time of each NCO sampling interval, the computational resources may be cycled 6 times to produce new code phases and PN chips for each of 6 channels or Rake Fingers. This allows, for example, a single adder to compute for 6 phase accumulators. The six fractional and integer code phases are stored in RAM storage cells, and can be retrieved sequentially for processing. The new code phases are then sequentially updated back into the RAMs. Also, in this example, RAM is utilized to store the entire PN sequence for each channel. Thus, arbitrary sequences can be generated, and the phase accumulator circuitry merely plays back the chips at the correct rate. Alternatively, specific PN sequence generators could be constructed, with a slight modification of the indicated block diagram. A specific implementation requires a combination NCO/PN-Generator for each simultaneously tracked channel or Rake Finger, plus an additional one for acquisition.

In the sixth aspect of the present invention, it can be seen that the core matched filter architecture readily supports beamforming through the despreading of multiple antenna elements for each signal band independently for each user channel and Rake Finger, and presenting the narrowband data to the demodulator for weighting and combining. This is facilitated by first treating each antenna element as if it were just another supported band, and passing the digitized element samples into the multi-band matched filter. Second, the Slice architecture could then be configured to assign each channel-element to a unique Slice for despreading. Such an embodiment would directly extend the previously disclosed architecture (U.S. patent application Ser. No. 09/707,909, filed Nov. 8, 2000) with essentially no change to the matched filter itself, but would likely require a large number of Slices to implement (#channels * #elements * #Rake-Fingers). This could also have the side-effect of increasing the relative length of the data delay lines (i.e., N*M, by increasing N).

An alternative embodiment, described here and illustrated in FIG. 2, evolves the Slice architecture by despreading all elements/channel or elements/Rake-Finger within a single Slice. This has several advantages: in the first advantage, the single PN-stream needed by each element is already available in the Slice; in the second advantage, the time-aligned samples for each element are all available (either from registers, or having been read from RAM) in the same processing clock cycle for multiplication; and third, the overall Slice count and delay line length may be reduced to (#channels * #Rake-Fingers). So, in this embodiment, each Slice requires E multipliers, and E early/on-time/late integrators. After a configurable amount of integration within the Slice, the stream of early/on-time/late partial integrations for each element are multiplexed into a sequential stream and presented to the multi-channel demodulator for further processing.

What is significant about this aspect of the present invention is its ability to reduce the beamforming computational burden proportionally to the matched filter decimation ratio, and utilize that advantage by sequentially processing the despread element samples in the demodulator. This allows the demodulator hardware to be multiplexed to accomplish combined carrier tracking, AGC, and beamformer weighting and combining, using minimal additional hardware resources compared to a non-beamforming demodulator. This advantage in beamforming, combined with the similar ease with which Rake combiner capability is also added, along with the possibility of joint processing of these functions for improved receiver performance, represents a significant improvement over implementations in the prior art.

The seventh aspect of the present invention is the sharing of existing computational resources in the demodulator to perform the actual beamforming weighting and combining functions. To form a beam on a given channel/Rake Finger, each complex sample must be multiplied by the appropriate complex weight (to cause the desired rotation of the vector). After the weighting/rotations are performed, the complex element samples can then be added together-the summation will constructively combine energy for signals arriving at the antenna array from the desired direction (and sidelobes), and destructively cancel elsewhere.

A schematic dataflow diagram showing elements and corresponding weights is shown in FIG. 5, along with mathematical operations necessary to perform beamforming. In the prior art, the physical implementation of this could take the form of anything from literally implementing the diagram as shown (for sampling rates equal to the processing rate), to a single complex multiplier and two accumulators (for sampling rates much less than the available processing rate). The innovation of the present invention is illustrated from a high level in FIG. 1, where the entire beamforming operation can be seen to be absorbed into computation already taking place in the demodulator for carrier tracking rotation, AGC scaling, and symbol integration. The only added complexity is the additional scalar adder that rotates the carrier NCO accumulated phase by the desired beamformer phase shift, prior to using the phase to determining corresponding SIN/COS amplitude, as well as additional multiply operations per sample due to the elements (E times as many multiplies).

FIG. 6 illustrates this in more detail, along with an example enumeration of the actual data operands that would flow through this process (element data samples, carrier NCO samples, and beamformer weights). Whereas in the conventional implementation (FIG. 5) only complex multiplies and summation are required, this technique is split into the beamformer rotation and the beamformer scaling as separate operations. This is due to the manner in which this technique works. Normally, multiplication of the complex weight and the complex element sample simultaneously rotates and scales the element I/Q vector. However, in the manner of this invention (FIGS. 1 and 6), the existing carrier rotation circuitry is exploited to serve the additional purpose of beamforming rotation. This is done by computing the desired carrier rotation for carrier tracking (which would be constant for each element for a given channel/Rake Finger), but adding to that the additional rotation desired (different for each element) for beamforming. While this achieves the desired element rotation, the gain coming out of the carrier NCO look-up table is fixed.

Thus, the scaling portion of the beamforming weighting operation is not yet done, and must be performed in a subsequent scalar multiply on each I and Q. Conveniently, just such a function is already next in the demodulator dataflow-the AGC function. Since software typically performs both the beamformer weight calculation and the AGC scale factor, at a relatively slow rate, the multiply is absorbed into a software operation to modify the AGC weight to also include the beamformer weight, and the single pair of existing scalar multipliers is used to serve both purposes.

In the eighth aspect of the present invention, snapshots of element data may need to be captured for various processing to aid the beamformer adaptive algorithms. By performing the beamforming on despread, narrowband data, the snapshot memory functionality benefits from the decimated sampling rate and potentially becomes reduced in complexity. This may be a benefit manifested in reduced implementation cost.

In the ninth aspect, the present invention enables advanced adaptive beamforming algorithms to be implemented, through the full integration and tight coupling of the beamformer with the demodulation process. Typically, in the case of a beamformer that is more standalone and distinct from demodulation, the beamformer would be able to point to a known signal location (DOA), and adaptively form nulls to mitigate powerful, readily measurable sources of interference. This invention, however, makes much more information available to the beamforming algorithm. By providing demodulator metrics to the beamformer algorithm, a closed loop is formed between demodulator performance (PN/carrier/symbol SNR/phase), and the weight adaptation process. This facilitates the use of algorithms that start with known information, such as signal DOA and interference DOA, and iteratively find the best weights that minimize the demodulator's prioritized, observable errors. Even after the symbol demodulator, error-control decoding performance metrics can also be fed back to the optimization process.

In the tenth aspect, the present invention combines the advantages of beamforming and Rake combining, yielding a result that improves SNR (actually, SINR-Signal-to-Interference-plus-Noise-Ratio, but the term SNR will continue to be used for convenience) with respect to either technique applied in isolation. By itself, beamforming is advantageous because it simultaneously increases the effective antenna aperture in the direction of the desired signal (as well as sidelobes), while also decreasing the effective antenna aperture in other directions, perhaps containing interferers. With an adaptive algorithm, the beam can actually be formed to perfectly null out detected interferers; typically, a compromise is actually made between these extremes, balancing desired signal gain and interfering signal attenuation.

The preferred embodiments of the present invention have the advantage of being able to form a completely independent set of beams on each signal channel, or on each Rake Finger of each signal channel. This allows each user channel the luxury of all degrees of freedom afforded by the available antenna elements to optimize its SNR. Furthermore, this allows each multipath component to be optimized independently as well. In many environments where multipath is prevalent, each multipath component (reflection) is likely to come from a different direction (DOA). Likewise, in those same environments the interference signals are likely to be subject to the same multipath conditions, causing interference power to be distributed among different DOAs as well. Thus, each desired signal multipath component really requires a completely different beam pattern, in order to optimize its particular signal gain and interference rejection situation.

It may be the case that a large multipath component-desirable for combining-arrives from the same direction as a strong interference signal. This may result in the situation where a beam pattern cannot be generated that both passes the desired signal, and excludes the interferer. This is an example of the strength of the joint beamformer/Rake optimization capability afforded by the present invention: an intelligent algorithm in the demodulator can make use of the broad information presented to it to select (or iteratively determine based on demodulator feedback) the best combination of multipath elements and beam patterns to optimize demodulator SNR. In this example, it may be necessary to reject the multipath component from combining, and choose one with better spatial isolation from interference.

In the eleventh aspect of the present invention, complex, integrated, beamformed symbol data is maintained coherently for each channel, and for each Rake Finger, and presented to a single-point detection process within the demodulator as shown in FIG. 8. Also available to this process is the integrated PN and carrier phase error, as well as information about the beamformer processing. Using this wealth of information, a single, unified, combiner-detection algorithm can now be used to optimize the SNR of each signal channel. Having already applied the benefits of beamforming to spatially isolate each desired incident signal component, and integrated/decimated each sampled stream to (or near) the symbol rate, it is necessary at this point in the demodulation process to form soft symbol decisions.

Although there are many ways in which this process could be carried out, a few example methods will be outlined for clarity. In the simplest method, samples for each Rake Finger are integrated to the symbol level, and then delayed, weighted, and combined according to various combining schemes well known in the literature. Then, a soft decision is formed on the combined result and output to the next process (e.g., error control decoding).

In a more complicated method, the process just described is used to independently form soft decisions for each of multiple signals sharing the same frequency channel (for example, co-channel signals in a CDMA system). These independent soft decisions are each corrupted by the combined co-channel interference of all of the other channels, due to imperfect orthogonality of the spreading codes. However, the character of the co-channel interference is now somewhat understood, having just formed soft decision estimates of each of the interferers. Thus, a process can now be followed to subtract the effects of the estimated interference from each signal, resulting in an improved estimated soft decision of each channel. Naturally, since the procedure just followed results in improved estimates of each interferer, it can be repeated, and in fact applied iteratively until each soft decision is somewhat cleansed of the effects of the co-channel interference. This process, joint detection, is a form of multi-user detection (MUD), and is one of many such techniques that is well described in the technical literature.

In even more complicated methods, the MUD iterative process can be combined with the Rake process, and perhaps even the beamforming process, to afford an almost arbitrary level of optimization to be achieved. What is novel in the present invention is the scalable architecture which efficiently processes all the available information, and makes it available to the demodulator to enable such algorithms to be implemented. The present invention allows spatial diversity (antenna elements), time diversity (Rake Fingers), and intelligent processing of interference (beam patterns, co-channel joint detection) information to be jointly optimized in a common demodulation and detection process.

In the twelfth aspect, the present invention facilitates a highly flexible, adaptable software radio architecture that allows a fixed hardware structure of computational dataflow elements to be tasked on a dynamic basis as needed. This allows the controlling software to choose how the hardware resources are allocated between the number of user channels, the number of channels supporting Rake, the number of Rake Fingers per channel (could be different on each channel), and the length of the acquisition matched filter. Furthermore, the actual processing capacity of this architecture really depends on the relationship between the extent of physical resources actually committed (e.g., #multipliers/Slice, or #Slices), the maximum processing clock rate supported by the implementing technology, and the desired input data sampling rate-therefore, an embodiment of this invention could allow the aforementioned features to be further traded-off against input sample rate. Note that yet another related consideration is the relationship between the number of bands and elements, and the number of datapaths that an embodiment implements—if there are more elements and bands than datapaths, the effective sampling rate must be increased to accommodate multiplexing. Thus, the present invention enables the dynamic tradeoff of all these features and issues, which represents a clear improvement over the prior art, and which is much needed in the rapidly evolving and complex wireless communications field.

In the thirteenth aspect, the preferred embodiment of the present invention incorporates all elements for a given channel or Rake Finger directly into the Slice architecture, rather than treating each element as if it were an independent channel (as the Rake Fingers are treated by the matched filter). While either of these methods could be chosen to implement a specific embodiment under this invention, there are advantages to the former method, as illustrated in FIG. 2. Specifically, by incorporating the despreading of all elements for a given channel or Rake Finger into the same Slice, the integrations remain exactly time-aligned, which is required for coherent beamforming (while this could certainly still be satisfied in other embodiments, such as one element per Slice, the timing and control problem is more complicated). The dataflow control within the Slice is also simplified, because each element sample is automatically available in parallel for multiplication by the PN sequence. Furthermore, each element shares the same PN-Generator in a direct and convenient fashion, because the PN code phase misalignment on each element due to the angle of arrival at the element array should in most cases be negligible compared with the length of each chip.

In addition, another benefit to this aspect of the present invention lies in the ability to obtain the benefit of beamforming gain on the early and late error integrations. By rotating and combining the early/late outputs from each element, a single, coherent PN code phase error is generated, which is used to correct a single PN-tracking loop for each channel or Rake Finger.

In the fourteenth aspect of the present invention, the architecture of the preferred embodiment allows a single carrier tracking loop and a single symbol tracking loop to track all of the elements for a channel or Rake Finger. This is similar to the single PN tracking loop just described. The reduction in the number of tracking loops is useful in minimizing the demodulator complexity.

In the fifteenth aspect, the present invention represents a substantial improvement over implementations described in the prior art, particularly with respect to the calibration problem. In the ideal case, the geometry of the antenna array would be precisely known, each antenna element would exhibit identical performance characteristics, and the entire RF downconversion path through the A/D converters would have identically matched delay and other attributes. Furthermore, this perfection of array and element pathways must be maintained over time, temperature, and other variations. It is well known that this can only be achieved with limited precision, and that the resulting mismatch errors will severely degrade the ability to form a coherently phased beam. As a result, element calibration is required.

To calibrate the array and element pathways, a commonly used technique is to generate a reference signal at the center frequency of the array, and couple this reference signal into the receiver antenna elements such that a known and fixed angle of incidence (DOA) is achieved. Resources are then allocated within the beamformer hardware to measure the phase of the reference signal after propagating through the entire RF pathway for each element. In this way, the relative phase error for each element path can be measured over time. Once the phase mismatches are known, a calibration vector is formed which is embedded in the beamformer weight calculations in such a way as to remove most of the effects of the mismatch from the beamforming process. This calibration vector must be updated periodically to keep up with changes in the mismatch between elements. In some cases, this calibration method is sub-optimal, because it ignores any dispersive effects of the atmosphere that may slightly skew the signal arriving at each element.

In the present invention, the calibration process is greatly simplified and improved. In fact, due to the integration of the beamformers with the demodulators for each channel and Rake Finger, calibration can be done for each antenna element signal path in the absence of any additional calibration signal, and without consuming any additional matched filter or demodulator processing resources. Furthermore, calibration can be performed independently on each signal channel or Rake Finger, taking into account any atmospheric distortions that may distinguish their different propagation pathways. Finally, this process of calibration actually closes a loop between the beamforming process, and the integrated carrier error terms on a per element basis-the residual carrier phase error resulting from imperfections in pointing the beamformer are systematically forced to zero as a result. Thus, the complexity of calibration is reduced, no additional hardware is required, and the quality of calibration becomes nearly perfect, on a per-signal basis.

The way that this calibration is implemented, at essentially zero increase in cost, is once again due to the way the present invention embeds all despread element information with the demodulator, where the actual beamforming weighting and combining occurs. In the normal operation of the present invention, the element rotation complex multiplication occurs sequentially on an element by element basis, followed by the scalar magnitude multiplication, after which the products are combined by integrating and dumping in an accumulator (see FIGS. 1 and 6). In normal operation, only the combined weighted elements are subsequently used for symbol demodulation, and only a single PN, symbol, and carrier tracking loop is formed. As a result, the individual rotated element samples are not needed. However, those individual rotations are actually calculated, and can be saved and integrated for an arbitrary amount of time to achieve an extremely accurate accumulation of residual carrier phase error per element. If the pointing were perfect, the integrated error would approach zero. Any non-zero residue represents calibration error for that element, which can now be corrected and fed back to the weights. The only additional cost associated with this calibration process is additional memory or registers to store the per-element integrations, and an additional adder to perform the sequential integration.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive facility. Thus, the present invention is not intended to be limited to the embodiments shown herein but is to be accorded the widest scope consistent with the principles and novel features disclosed herein.

What is claimed is:

1. A multiple frequency band, multiple channel radio receiver comprising a front end circuitry, including multiple antenna elements, for providing complex base band samples for a plurality of frequency bands and multiple channels in digital format, a parallel digital matched filter in which common digital arithmetic elements are used for both acquisition and tracking purposes connected to said front end circuitry, said matched filter being arranged to perform a plurality of simultaneous correlations of received spread spectrum signals against selected replica offsets of a spreading sequence, said parallel digital matched filter providing N slices with M stages per slice and W bit data quantization, wherein N, M, W are integer, each slice being adapted to perform 1/N of the acquisition computation and then is handed off to become a dedicated tracking module for one channel, respectively, and an integrated multi-element adaptive digital beamformer combiner connected to said parallel digital matched filter.

2. The multiple frequency band, multiple channel radio receiver defined in claim 1 wherein said matched filter includes an N*M stage data delay line composed of B distinct bands, each band being composed of E distinct elements of 2*W bits each and a single numerically controlled oscillator to serve as a control digital frequency source matched to the expected chipping rate of the incoming signal; wherein: E is the number of elements, B is the number of bands, where E and B are integer.

3. The multiple frequency band, multiple channel radio receiver defined in claim 1 including a Rake Combiner for mitigating the effects of multipath interference dominated communication channels connected to said parallel digital matched filter.

4. A multiple frequency band, multiple channel radio receiver comprising a front end circuitry, including multiple antenna elements, for providing complex base band samples for a plurality of frequency bands and multiple channels in digital format, a matched filter in which common digital arithmetic elements are used for both acquisition and tracking purposes connected to said front end circuitry, said matched filter being arranged to perform a plurality of simultaneous correlations of received spread spectrum signals against selected replica offsets of a spreading sequence, said parallel digital matched filter providing N slices with M stages per slice and W bit data quantization, wherein N, M, W are integer, each slice being adapted to perform 1/N of the acquisition computation and then is handed off to become a dedicated tracking module for one channel, respectively, and integrated multi-element adaptive digital beamformer and Rake Combiners connected to said matched filter.

5. The multiple frequency band multiple channel radio receiver defined in claim 4 including a multi-channel demodulator connected to said matched filter for simultaneously processing all bands, elements and channels and Rake Fingers.

6. A multiple frequency band, multiple channel radio receiver comprising a front end circuitry, including multiple antenna elements, for providing complex base band samples for a plurality of frequency bands and multiple channels in digital format, a matched filter in which common digital arithmetic elements are used for both acquisition and tracking purposes connected to said front end circuitry, said matched filter being arranged to perform a plurality of simultaneous correlations of received spread spectrum signals against selected replica offsets of a spreading sequence, said parallel digital matched filter providing N slices with M stages per slice and W bit data quantization, wherein N, M, W are integer, each slice being adapted to perform 1/N of the acquisition computation and then is handed off to become a dedicated tracking module for one channel, respectively, including a multi-channel demodulator processor connected to said matched filter for simultaneously processing all bands, elements and channels, and to function as an integrated multi-element adaptive digital beamformer combiner.

7. The multiple frequency band, multiple channel radio receiver defined in claim 6 wherein said multi-channel demodulator processor includes a defragmentation module to insure the maximum acquisition capability of said receiver is maintained over time.

8. The multiple frequency band, multiple channel radio receiver defined in claim 6 including a single clocking system synchronous to a data sampling clock for generating G independent NCO/PN-generators that produce PN chipping sequences whose average rates can precisely track the various received signal chipping rates, respectively.

9. The multiple frequency band, multiple channel radio receiver defined in claim 6 wherein said multi-channel demodulator processor is adapted to form a completely independent set of beams on each single channel on each Rake Finger of each signal channel.

10. The multiple frequency band, multiple channel radio receiver defined in claim 6 wherein as each channel is sequentially acquired by said matched filter, and said demodulator processor assures that common digital arithmetic elements are used both for acquisition and tracking purposes, respectively.

11. The multiple frequency band, multiple channel radio receiver defined in claim 6 wherein multiple data inputs and delay lines are present and are available for processing at each arithmetic element so that the matched filter/despreader processing is virtually independent of channel origin (e.g. CDMA users, beamform element, or Rake Fingers).

12. The multiple frequency band, multiple channel radio receiver defined in claim 6 wherein there is a common NCO/PN-generator within a common beamformer element set.

13. A multiple frequency band, multiple channel radio receiver comprising a front end circuitry, including multiple antenna elements, for providing complex base band samples for a plurality of frequency bands and multiple channels in digital format, a parallel digital matched filter in which common digital arithmetic elements are used for both acquisition and tracking purposes connected to said front end circuitry, said matched filter being arranged to perform a plurality of simultaneous correlations of received spread spectrum signals against selected replica offsets of a spreading sequence, said parallel digital matched filter providing N slices with M stages per slice and W bit data quantization, wherein N, M, W are integer, each slice being adapted to perform 1/N of the acquisition computation and then is handed off to become a dedicated tracking module for one channel, respectively, including a multi-channel demodulator processor connected to said matched filter for simultaneously processing all bands, elements and channels, and to function as an integrated multi-element multi-user detector.

14. The multiple frequency band, multiple channel radio receiver defined in claim 13 wherein said matched filter includes an N*M stage data delay line composed of B distinct bands, each band being composed of E distinct elements of 2*W bits each and a single numerically controlled oscillator to serve as a control digital frequency source matched to the expected chipping rate of the incoming signal; wherein: E is the number of elements, B is the number of bands, where E and B are integer.

15. The multiple frequency band, multiple channel radio receiver defined in claim 13 including a Rake Combiner for mitigating the effects of multipath interference dominated communication channels connected to said parallel digital matched filter.

16. The multiple frequency band multiple channel radio receiver defined in claim 15 including a multi-channel demodulator connected to said matched filter for simultaneously processing all bands, elements and channels and Rake Fingers.

17. The multiple frequency band, multiple channel radio receiver defined in claim 16 wherein said multi-channel demodulator processor includes a defragmentation module to insure the maximum acquisition capability of said receiver is maintained over time.

18. The multiple frequency band, multiple channel radio receiver defined in claim 13 including a single clocking system synchronous to a data sampling clock for generating G independent NCO/PN-generators that produce PN chipping sequences whose average rates can precisely track the various received signal chipping rates, respectively.

19. The multiple frequency band, multiple channel radio receiver defined in claim 13 wherein said multi-channel demodulator processor is adapted to form a completely independent set of beams on each single channel on each Rake Finger of each signal channel.

20. The multiple frequency band, multiple channel radio receiver defined in claim 13 wherein as each channel is sequentially acquired by said matched filter, and said demodulator processor assures that common digital arithmetic elements are used both for acquisition and tracking purposes, respectively.

21. The multiple frequency band, multiple channel radio receiver defined in claim 13 wherein multiple data inputs and delay lines are present and are available for processing at each arithmetic element so that the matched filter/despreader processing is virtually independent of channel origin (e.g. CDMA users, beamform element, or Rake Fingers).

22. The multiple frequency band, multiple channel radio receiver defined in claim 13 wherein there is a common NCO/PN-generator within a common beamformer element set.

* * * * *